Nov. 22, 1966   R. R. ATHERTON   3,286,469
ROCKET NOZZLE COOLING AND THRUST RECOVERY DEVICE
Filed July 7, 1961
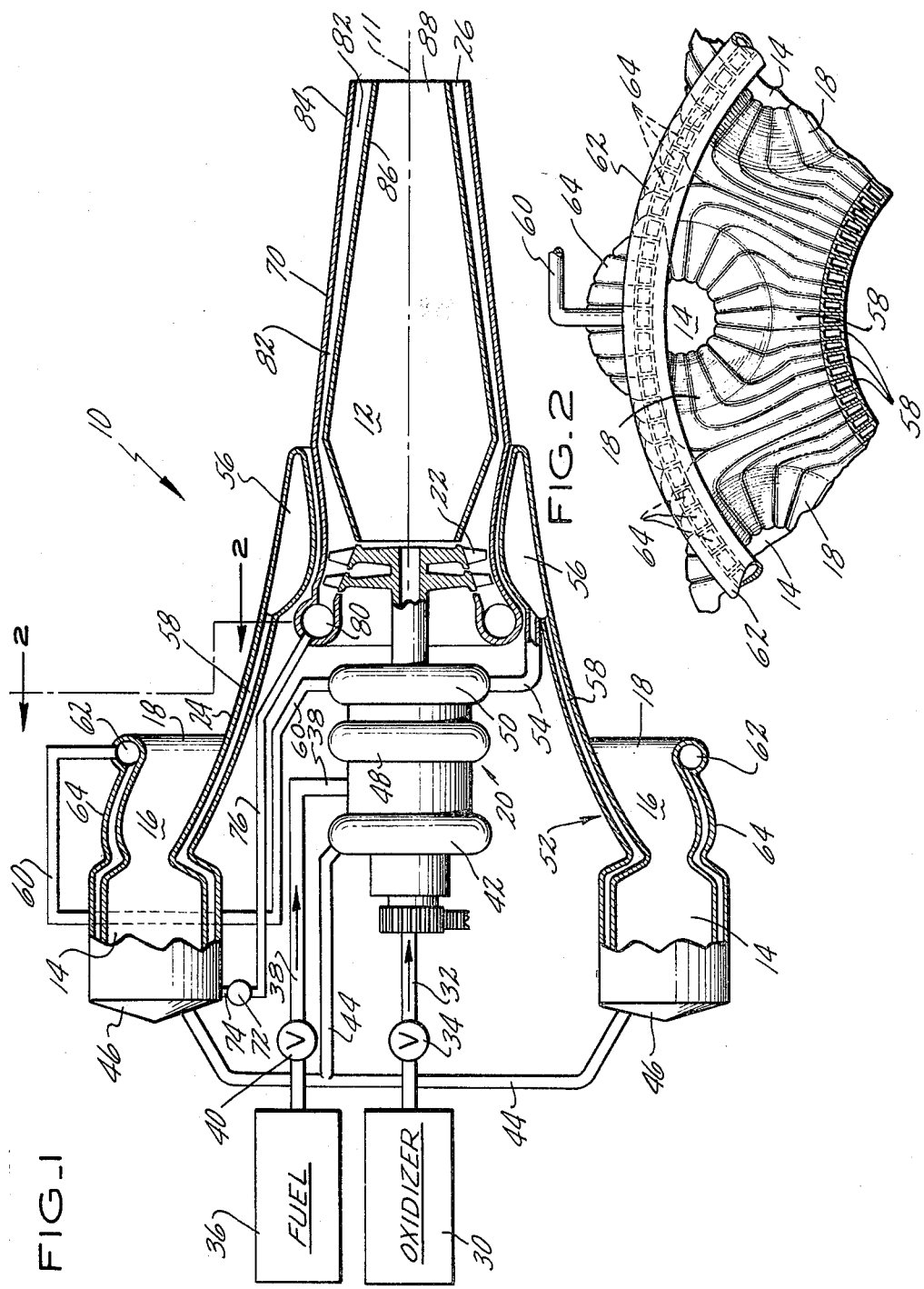
INVENTOR
ROBERT R. ATHERTON
BY Vernon F. Hauschild
ATTORNEY United States Patent Office 3,286,469
Patented Nov. 22, 1966

3,286,469
ROCKET NOZZLE COOLING AND THRUST RECOVERY DEVICE
Robert R. Atherton, North Palm Beach, Fla., assignor to United Aircraft Corporation, East Hartford, Conn., a corporation of Delaware
Filed July 7, 1961, Ser. No. 122,447
6 Claims. (Cl. 60—224)

This invention relates to rocket engines and more particularly to a rocket engine having a plug type exhaust nozzle.

It is an object of this invention to teach a rocket engine which has a plug type exhaust nozzle formed in part by the fuel jacket of a regenerative fuel system and in part by ducting which defines a cooling passage through which the fuel pump driving turbine discharges to atmosphere thereby both cooling the ducting and generating thrust.

It is an object of this invention to teach such a rocket engine wherein the rocket thrust chamber, comprised of a combustion chamber and exhaust nozzle, together with a portion of the plug or central body are defined by the fuel jacket of the regenerative fuel system and the exhaust nozzle is so positioned and shaped that the products of combustion from the combustion chamber discharge through the exhaust nozzle and along the plug exterior to generate thrust.

It is a further object of this invention to teach such an engine wherein the fuel and oxidizer pump and the pump driving turbine are enveloped within the plug of the nozzle.

It is still a further object of this invention to teach such an engine wherein the gasified fuel from the regenerative fuel cycle drives the fuel and oxidizer pump driving turbine and is then discharged through an annular cooling passage defined by ducting which further defines a portion of the central plug and is discharged to atmosphere therethrough in an expanded condition and at high velocity to generate thrust thus overcoming the loss in thrust and specific impulse normally associated with a gas generator driven turbo-pump system.

It is a further object of this invention to teach a rocket engine with a plug type nozzle, which nozzle has provisions for wall cooling throughout its entire length.

Other objects and advantages will be apparent from the specification and claims and from the accompanying drawings which illustrate an embodiment of the invention.

FIG. 1 is a cross-sectional showing of my plug type rocket engine.

FIG. 2 is a partially enlarged view taken along line 2—2 of FIG. 1.

Referring to FIG. 1 we see my plug type rocket engine 10, which is of generally circular cross section and concentric about axis 11, which comprises a plug or central body or member 12, combustion chamber 14, thrust chamber 16, exhaust nozzle 18, fuel and oxidizer pumps 20, and pump driving turbine 22.

It will be noted that plug 12 is of circular cross section and concentric about axis 11 and converges toward axis 11 from its forward end 24 to its after end 26. Plug 12 has provision for wall cooling throughout its entire length in a fashion to be described hereinafter.

My engine utilizes a regenerative fuel system wherein a typical rocket oxidizer, such as oxygen, which is available in reservoir 30 is provided to pump 20 through line 32 which has appropriate valve means 34 and may well include auxiliary pumping means (not shown). In addition, a typical rocket fuel, such as hydrogen, is provided to turbo-pump 20 in similar fashion from reservoir 36 through line 38 which has appropriate valve 40 and any necessary auxiliary pump means (not shown). Oxidizer enters pump stage 42 and is pumped therefrom through line 44 into injector heads 46 which may be of the type fully described in U.S. application No. 821,067, for Injector Head for Rockets, Walter A. Ledwith et al., filed June 17, 1959, now Patent No. 3,115,009, for distribution into combustion chamber 14. The fuel enters stages 48 and 50 of pump 20 and is pumped therefrom into fuel jacket 52. Fuel jackets 52 may comprise spaced walls defining a hollow fuel passage therebetween but is preferably of tubular construction as more fully described in U.S. application Serial No. 813,801, for Rocket Nozzle with Directional Control, Walter A. Ledwith and Philip P. Newcomb, filed on May 18, 1959, now Patent No. 3,069,850. The fuel from turbo-pump 20 enters cooling jacket 52 both through line 54 which leads the pumped fuel, still in liquid form, into annular manifold 56 and therefrom through the frusto-conical portion 58 of cooling jacket 52 which forms the forward part of nozzle plug 12. Fuel from turbo-pump 20 also passes through line 60 into ring manifold 62 and thence into the outer portion 64 of fuel jacket 52. Fuel jacket 52 extends forwardly to cooperate with injector head 46 in defining and providing the walls for combustion chamber 14 and exhaust nozzle 18 thereby defining thrust chamber 16. Combustion chamber 14 and exhaust nozzle 18 may well be of unitary annular construction but are preferably made up for a plurality of equally spaced, circumferentially positioned units which include combustion chambers 14 of circular cross section and exhaust nozzles 18 of either oval or rectangular cross section at their exit plane as best shown in FIG. 2, which are formed to meet with the circular combustion chamber 14. Thrust chamber 16 is so positioned and shaped that the products of combustion which are discharged therefrom expand along the outer surface 70 of plug 12 to perform a thrust generating function and also to gasify the fuel which is passing through frusto-conical portion 58 of fuel jacket 52 for utilization in driving turbine 22 in a fashion to be described hereinafter.

A portion of the gasified fuel passed through frusto-conical portion 58 of fuel jacket 52 proceeds to injector head 46 which may be of the type disclosed in U.S. application Serial No. 821,067 for distribution into combustion chamber 14 where it is burned with the oxidizer provided thereto, with the products of combustion thereof being discharged through thrust chamber 16 along the outer surface 70 of plug 12. The remainder of the gasified fuel enters ring manifold 72 through lines 74 and proceeds therefrom in gasified form through lines 76 into annular turbine inlet manifold 80 to be passed therefrom through the alternate rotor and stator stages of turbine 22 to drive the turbine. After driving the turbine, the gasified fuel is passed through the annular cooling passage 82 which is formed between outer and inner ducts 84 and 86, respectively, and discharged rearwardly through outlet 88 in an expanded fashion and at high velocity to generate thrust. The turbine discharge gasified fuel cools walls 84 and 86 and hence the after end and outer surface 70 of plug 12 which is exposed to the intense heat of the products of combustion discharged therealong from combustion chamber 14. The forward end of plug 12, which is defined by the frusto-conical portion 58 of fuel jacket 52, is cooled by the fuel being pumped therethrough. Accordingly, the regenerative fuel cycle and the gasified fuel discharged from the pump driving turbine cooperate to cool the entire exposed surface of plug 12.

It will be noted that pump 20 and turbine 22 are enveloped within plug 12 so that they present no additional frontal area to impede flight. Preferably, turbine 22 and turbo-pump 20 are co-axial about axis 11 and are connected by appropriate shafting such that the aforementioned passage of gasified fuel through turbine 22 drives the turbine which in turn drives the stages 42, 48 and 50 of pump 20. Pump 20 may be of the type fully described in U.S. patent application 21,835 for Pump Inducers, F. W. Reichenbacher and F. Lattanzio, filed April 12, 1960, now Patent No. 3,155,044, but is preferably a co-axial version thereof. Turbine 22 may well be of the type disclosed in U.S. application Serial No. 21,829, for Turbopump Arrangement, F. W. Reichenbacher and F. Lattanzio, filed April 13, 1960, now abandoned.

It is to be understood that the invention is not limited to the specific embodiment herein illustrated and described but may be used in other ways without departure from its spirit as defined by the following claims.

I claim:

1. A rocket engine comprising a central, rearwardly tapered, expansion plug concentric about an axis defined by a fuel jacket at its forward end and a cooling duct at its after end, means to provide fuel to said jacket, at least one combustion chamber, defined at least in part by said fuel jacket and connected to receive fuel therefrom while positioned to provide products of combustion into a thrust nozzle, said thrust nozzle defined at least in part by said fuel jacket thereby making at least some of said fuel gaseous and positioned to discharge products of combustion along said central plug to generate thrust, means to pass said gaseous fuel through said cooling duct.

2. A rocket engine comprising a convergent central body defined by a regenerative fuel jacket at its forward end and a cooling duct extending therefrom to its after end, a combustion chamber connected to said jacket and including an exhaust nozzle shaped to direct products of combustion along said central body, and means to pass fuel through said jacket for gasification therein and distribution therefrom to said combustion chamber and through said cooling duct.

3. A rocket engine concentric about an axis and comprising a central body which converges toward said axis from its forward to its after end and being defined by a fuel conducting jacket at its forward end and a duct means defining an annular cooling passage at its after end, a combustion chamber defined at least in part by said jacket and connected to said jacket and including an exhaust nozzle shaped to direct products of combustion along said central body, a turbine connected at its inlet to said jacket and connected to discharge into said cooling passage defining duct means, and pump means driven by said turbine and connected to pump oxidizer to said combustion chamber and fuel to said jacket for gasification therein and distribution therefrom to said combustion chamber and through said turbine and cooling passage.

4. A rocket engine concentric about an axis and comprising a regenerative fuel jacket which is frusto-conical in part and which defines a combustion chamber terminating in an exhaust nozzle positioned and shaped to discharge products of combustion along the exterior of said frusto-conical portion, duct means defining an annular cooling passage positioned downstream of said frusto-conical portion and shaped to define a continuation thereof, a turbine connected to discharge through said cooling passage, and a pump driven by said turbine and connected to provide an oxidizer to said combustion chamber and fuel to said jacket for gasification therein and thence distribution to said combustion chamber and expansion through said turbine to drive said turbine and be discharged through said cooling passage.

5. A rocket engine concentric about an axis and comprising a regenerative fuel jacket which is frusto-conical in part and which defines a combustion chamber terminating in an exhaust nozzle positioned and shaped to discharge products of combustion along the exterior of said frusto-conical portion, duct means positioned downstream of said frusto-conical portion and shaped to define a cotninuation thereof and defining an annular cooling expansion passage discharging rearwardly to atmosphere, a turbine enveloped within said fuel jacket and connected to discharge through said cooling passage, and a pump enveloped within said fuel jacket and driven by said turbine and connected to provide an oxidizer to said combustion chamber and fuel to said jacket for gasification therein and thence distribution to said combustion chamber and expansion through said turbine to drive said turbine and be discharged to atmosphere through said cooling passage.

6. A rocket engine concentric about an axis and comprising a regenerative fuel jacket concentric about said axis and which is frusto-conical in part and which defines a plurality of circumferentially positioned combustion chambers each terminating in an exhaust nozzle positioned and shaped to discharge products of combustion along the exterior of said frusto-conical portion, duct mean concentric about said axis and positioned downstream of said frusto-conical portion and shaped to define a continuation thereof and defining an annular cooling expansion passage discharging rearwardly to atmosphere, a turbine enveloped within said fuel jacket and connected to discharge through said cooling passage, an oxidizer source, a fuel source and a pump connected to said sources and enveloped within said fuel jacket and driven by said turbine and connected to provide oxidizer to said combustion chamber and fuel to said jacket for gasification therein and thence distribution to said combustion chamber and expansion through said turbine to drive said turbine and be discharged to atmosphere through said cooling passage.

References Cited by the Examiner

UNITED STATES PATENTS

| 2,780,914 | 2/1957 | Ring | 60—35.6 |
| 2,870,603 | 1/1959 | Long | 60—35.6 |

MARK NEWMAN, *Primary Examiner.*

SAMUEL FEINBERG, *Examiner.*